Oct. 28, 1969  J. C. AMIDON ET AL  3,474,995
UTILITY POLE INSULATOR BRACKET EXTENSION
Filed June 23, 1967  3 Sheets-Sheet 1
FIG. 2
FIG. 1
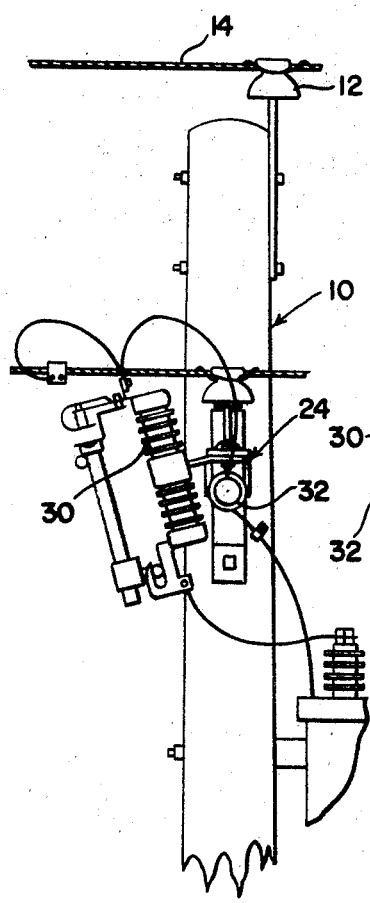
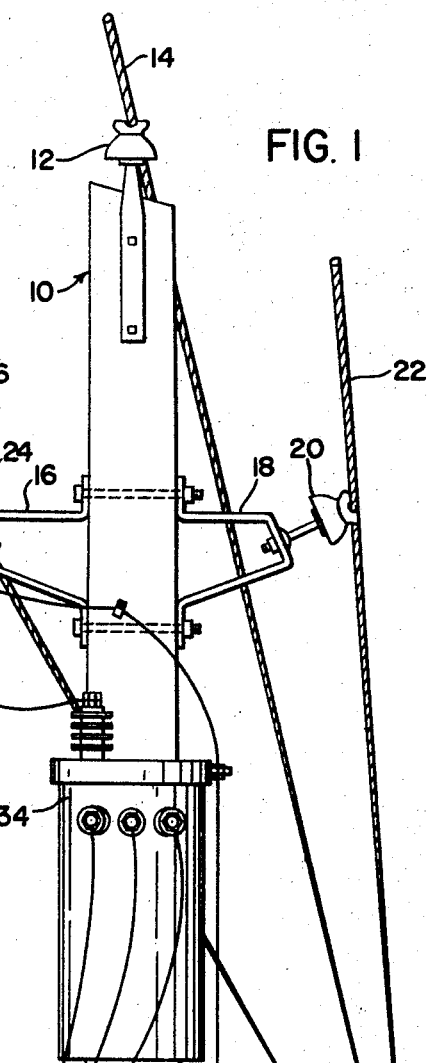
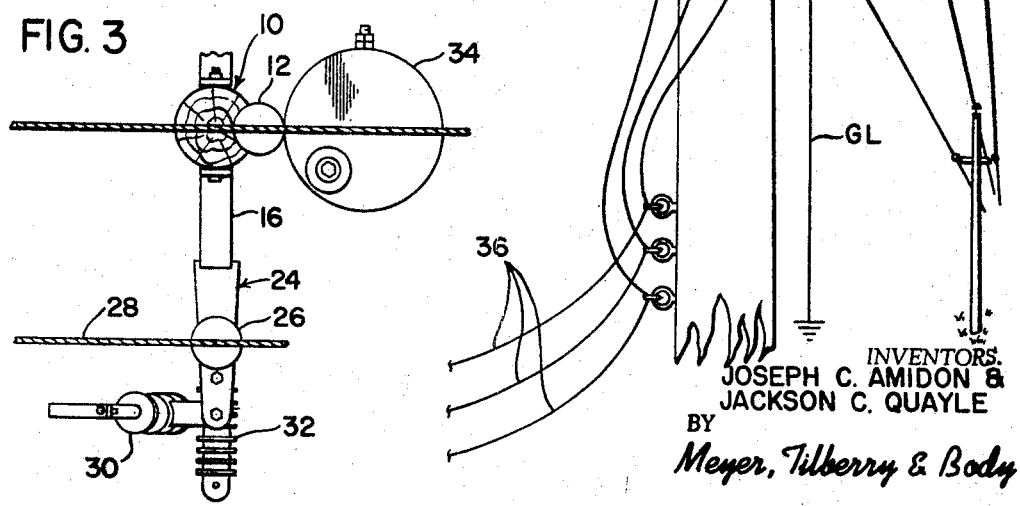
FIG. 3
INVENTORS.
JOSEPH C. AMIDON &
JACKSON C. QUAYLE
BY
Meyer, Tilberry & Body
ATTORNEYS Oct. 28, 1969   J. C. AMIDON ET AL   3,474,995
UTILITY POLE INSULATOR BRACKET EXTENSION
Filed June 23, 1967   3 Sheets-Sheet 3

INVENTORS.
JOSEPH C. AMIDON &
JACKSON C. QUAYLE
BY
*Meyer, Tilberry & Body*
ATTORNEYS

United States Patent Office 3,474,995
Patented Oct. 28, 1969

3,474,995
UTILITY POLE INSULATOR BRACKET EXTENSION
Joseph C. Amidon, Ashtabula, and Jackson C. Quayle, Twinsburg, Ohio (both of P.O. Box 5000, Cleveland, Ohio 44101)
Filed June 23, 1967, Ser. No. 648,405
Int. Cl. F16m 13/02; F16l 3/08
U.S. Cl. 248—221
2 Claims

ABSTRACT OF THE DISCLOSURE

A utility pole insulator bracket extension for safely mounting electrical devices to a utility pole characterized by the absence of wooden cross arms. The extension permits safety devices, such as lightning arresters and cutout switches, to be mounted further away from a utility pole than are insulators which provide tangent support for line conductors.

---

This invention pertains to the art of electrical power distribution and, more particularly, to a utility pole insulator bracket extension for mounting such electrical safety devices as lightning arresters or switching and fusing elements in combination with line conductors and insulators.

The invention is particularly applicable in conjunction with mounting lightning arresters or switching and fusing devices to utility poles and will be described with particular reference thereto; although, it is to be appreciated that the invention has broader applications.

In recent years, there has been a trend on the part of electrical utility companies to eliminate the typical wooden cross arms on utility poles in an attempt to improve the overall appearance and provide a less cumbersome looking utility pole. The typical wooden cross arms are being replaced with more pleasing appearing insulator brackets which serve to support the electrical power lines. Such brackets are normally mounted directly to the utility pole, and serve to mount an electrical insulator which provides tangent support for an electrical power line. A typical insulator bracket includes a horizontal portion which extends outwardly from a utility pole and terminates in a second insulator mounting portion which extends downwardly from the first portion and outwardly from the utility pole. A brace portion secures the lowermost edge of the second portion with the utility pole. Such insulator brackets do not have the capability for also safely supporting additional equipment, such as lightning arresters and cutout switches.

It is frequently desirable that safety equipment, such as lightning arresters and cutout fuses, be mounted further from the utility pole than are the power line conductors. This is done from a safety standpoint. More particularly, a typical type of cutout fuse or circuit breaker includes a fuse element, which, when activated at high current and voltages, melts with considerable violence, splattering hot metal or a fuse cap away from the circuit breaker. Thus, it is desirable that the fuse element be pointed away from and safely spaced from the utility pole to prevent injury to a lineman working on the utility pole. Lightning arresters are frequently of the type having a ground line disconnector. The operating characteristic of this type arrester is such that after a surge of voltage, should a power follow current continue, an explosive charge is activated to separate the ground line from the arrester to render it nonconductive. The power line is thus only momentarily connected to the ground line during the dangerous high voltage, high current period. When the explosive charge is activated, the free end, which is normally located on the bottom of the lightning arrester, is propelled in an uncontrolled fashion by the force of the explosive charge. Accordingly, the free end may become entangled with other electrical components, such as the circuit protector or other energized wires, which could possibly accidentally ground the power line.

It is desirous, therefore, that such electrical safety devices as lightning arresters and cutout fuses be mounted as far as possible from the utility pole. Preferably, they are mounted further away from utility pole than are the insulators which support line conductors so as to enable a lineman to make repairs to the insulator and its manner of support for the power line conductors without danger to himself. Further, it is desirous, from a safety standpoint, that the movable fuse element of the cutout fuse be pointed in such a direction that when it is discharged it will be displaced away from the utility pole to prevent injury to a lineman. Further, it is desirable that lightning arresters with ground disconnectors be mounted in such a manner that the movable element be pointed in such a direction that upon discharge the ground line will not become entangled with other electrical components, such as an electrical cutout assembly.

The present invention is directed toward a utility pole insulator bracket extension for satisfying the foregoing needs by permitting electrical safety devices, such as lightning arrestors and cutout fuses, to be mounted as far away as possible from a utility pole.

The present invention contemplates the provision of an insulator support bracket mounted to a utility pole, wherein the support bracket includes a first portion which extends horizontally away from the pole and terminates in a second portion which extends downwardly from the first portion and away from the pole, with the included angle between the two portions being greater than 90°.

In accordance with the present invention, a bracket extension is provided having first and second sections. The first section is adapted to be mounted to the second portion of the bracket, and the first section of the bracket extension extends at an angle downwardly from the second section and away from the pole. The included angle between the first and second sections of the extension bracket is such that its second section is substantially coplanar with the first portion of the bracket. The second section has means for mounting electrical components thereto, and means are provided for securing the extension to the bracket.

In accordance with a more limited aspect of the present invention, the second section is defined by vertical side edges which progressively taper inwardly toward each other in a direction extending away from the utility pole.

In accordance with a still more limited aspect of the present invention, the first section has means for receiving the second portion of the bracket in such a manner to prevent movement of the extension with respect to the bracket.

In accordance with a still more limited aspect of the present invention, the extension includes reinforcing web portions connecting the side edges of the first and second sections together.

The primary object of the present invention is to provide a utility pole insulator bracket extension which is simple in design, inexpensive to manufacture and convenient to use for supporting electrical safety devices on a utility pole, characterized by the absence of wooden cross arms.

A still further object of the present invention is to provide an extension bracket which incorporates novel features designed specifically to support high voltage electrical safety devices in noninterfering relationship with respect to each other.

A still further object of the present invention is to provide a bracket extension having a section which extends coplanar with a support bracket.

The foregoing objects and advantages of the invention will become more apparent from the following description of the preferred embodiment of the invention as illustrated in the accompanying drawings which are a part hereof and wherein:

FIGURE 1 is a view of one application of the invention illustrating a utility pole supporting power lines, insulator brackets, bracket extensions, a fuse cutout, a lightning arrester and a transformer;

FIGURE 2 is a side view of a portion of FIGURE 1;

FIGURE 3 is a top view of the apparatus shown in FIGURE 1;

Figure 4:
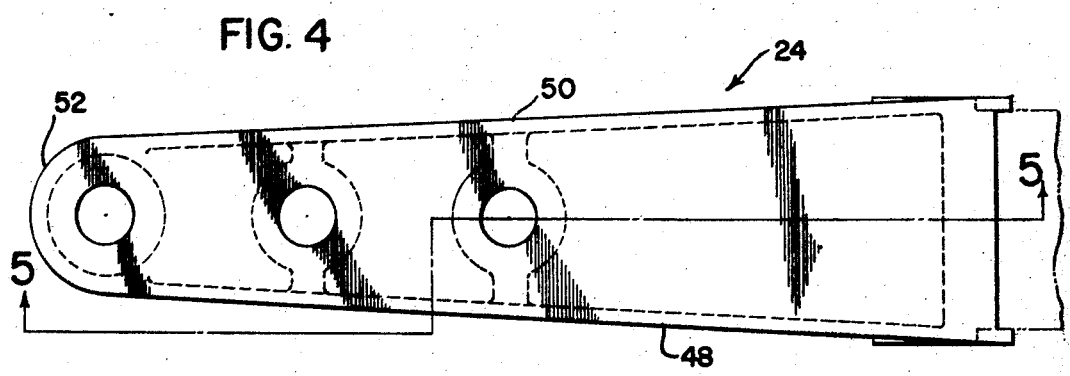
FIGURE 4 is a plan view of the preferred embodiment of the bracket extension.
Figure 5:
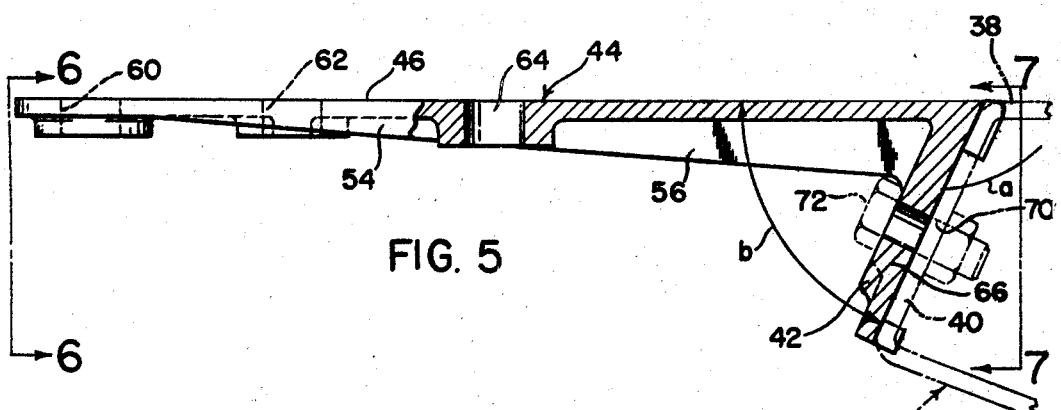
FIGURE 5 is an elevational view, partly in section, taken along line 5—5 looking in the direction of the arrows of FIGURE 4.
Figure 6:
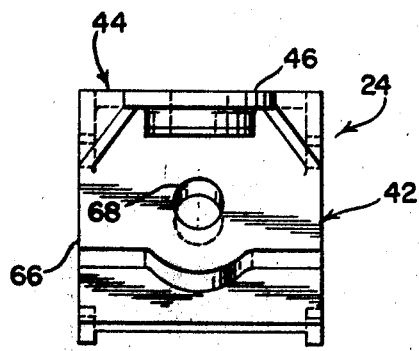
FIGURE 6 is a view taken along line 6—6 looking in the direction of the arrows of FIGURE 5.

Referring now to the drawings, and more particularly to FIGURES 1, 2 and 3, there is illustrated a utility pole 10 having an insulator 12 mounted on its upper end for purposes of supporting a line conductor 14. Pole 10 also supports a pair of insulator brackets 16 and 18. Bracket 18 has an insulator 20 mounted thereon for purposes of providing tangent support for a power line conductor 22. A bracket extension 24, constructed in accordance with the preferred embodiment of the invention, as described in greater detail hereinafter with reference to FIGURES 1 through 7, is mounted in cantilever fashion to bracket 16. Extension 24 serves to mount an insulator 26 providing tangent support for a power line conductor 28. In addition, extension 24 serves to mount at its free end a cutout fuse assembly 30. A lightning arrester 32 is also mounted to the extension 24 intermediate insulator 26 and cutout fuse assembly 30. Pole 10 also mounts a transformer 34. Extension 24 serves both for mounting an insulator 26 to provide support for power line 28, as well as a means for mounting fuse assembly 30 and lightning arrester 32 at points spaced as far as possible away from utility pole 10.

It will be noted, with reference to FIGURE 1, that the power line conductor 28 is electrically connected directly through lightning arrester 32 to ground line GL and thence to ground. Also, the power line conductor 28 is electrically connected through the fuse cutout assembly to the transformer 34 and thence to secondary lines 36 for consumer distribution. This arrangement differs from the arrangement wherein the fuse is connected in series with the transformer and located between the arrester and the power line, with the arrester being mounted on the transformer casing 34. However, with such an arrangement, the fuse may blow out more readily during lightning storms. It is desirable, therefore, to connect the lightning arrester directly with the power line 28; however, this type of arrangement presents the problem as to where the lightning arrester should be mounted so that it may be spaced from the utility pole a sufficient distance to permit the lineman to work in the area of the power line with safety. The extension 24 provides this desirable function by extending the length of the horizontal surface of bracket 16 a sufficient distance so that it may mount both an insulator 26 as well as the fuse cutout assembly 30 and the lightning arrester 32.

Reference is now made to FIGURES 4 through 7, wherein the details of construction of extension 24 and its manner of attachment to bracket 16 is shown in detail. Bracket 16 includes a horizontally extending portion 38 which extends outwardly from utility pole 10 and terminates in a portion 40 which extends downwardly from portion 38 and outwardly of pole 10. The included angle $\phi_a$ is greater than 90°.

Extension 24 is mounted in cantilever fashion to bracket 16. Extension 24 includes a first section 42 and a second section 44 which extends angularly from section 42, with the included angle $\phi_b$ being such the the angles $\phi_a$ and $\phi_b$ equals aproximately 180°. In this manner, the upper surface 46 of section 44 is substantially coplanar with the upper surface of portion 38 of bracket 16. As shown in FIGURE 4, section 44 is defined by vertically extending side edges 48 and 50, which taper inwardly in the direction of the free end 52 of extension 24. The free end 52 is rounded off so as to provide a smooth edge. The upper surface 44 is substantially flat and the thickness of the section 44 is substantially uniform throughout its length. Reinforcing webs 54 and 56 are located along the side edges of extension 24 and serve to connect the corresponding side edges of sections 42 and 44 together to provide a degree of reinforcement to permit the mounting of relatively heavy electrical components near the free end of extension 24. Extension 24 may be constructed of metal, plastic or reinforced plastic in the form of a casting, stamping, fabrication, or otherwise.

Section 44 has three circular shaped apertures 60, 62 and 64 extending therethrough. Aperture 64 normally serves to mount electrical insulators, such as insulator 26 shown in FIGURE 1, for purposes of providing tangential support for a line conductor. Aperture 62 is located intermediate apertures 60 and 64 and serves, for example, to support a lightning arrester 32. Aperture 60 is located as close as possible to the free end 52 and serves, for example, to provide support for such electrical components as a fuse cutout assembly 30.

Figure 7:
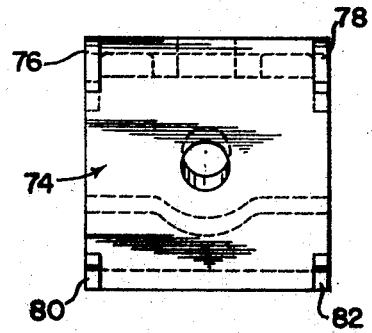
FIGURE 7 is a view taken along line 7—7 looking in the direction of the arrows of FIGURE 5.
Figure 8:
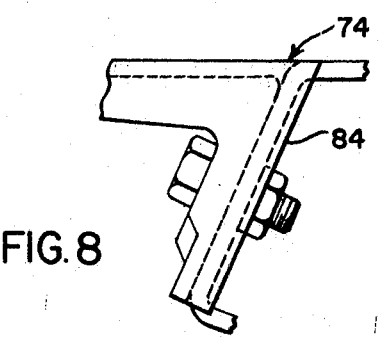
FIGURE 8 is an elevational view, partly in section, taken partially along line 5—5 looking in the direction of the arrows of FIGURE 4, but showing flanged sides instead of flanged cleats.

Section 42 of extension 24 includes a relatively thick walled portion 66 having an aperture 68 extending therethrough. Aperture 68 is in registry with an aperture 70 in portion 40 of bracket 16. Fastening means in the form of a nut and bolt assembly 72 extends through apertures 68 and 70 for purposes of securely fastening extension 24 to bracket 16. The width of section 42, as taken between the side edges thereof, is slightly greater than the width of portion 40 of bracket 16. To prevent sidewise movement of extension 24 with respect to bracket 16, either in a horizontal plane or about the axis defined by apertures 68 and 70, the back surface 74 of section 42 is provided with four flange cleats 76, 78, 80 and 82, as best shown in FIGURE 7, or flange sides 84 and 86, as shown in FIGURE 8. These cleats extend perpendicularly from surface 74 and are located at the four corners of section 42, in the manner shown in FIGURE 7. Likewise, the flange sides extend perpendicular from surface 74 in the alternate construction shown in FIGURE 8. The cleats are spaced from each other a sufficient distance that they serve to receive portion 40 of bracket 16 therebetween. Accordingly, once the nut and bolt assembly 72 is secured, the cleats or flanges, as the case may be, prevent sidewise and rotational movement of extension 24 relative to bracket 16.

Figure 9:
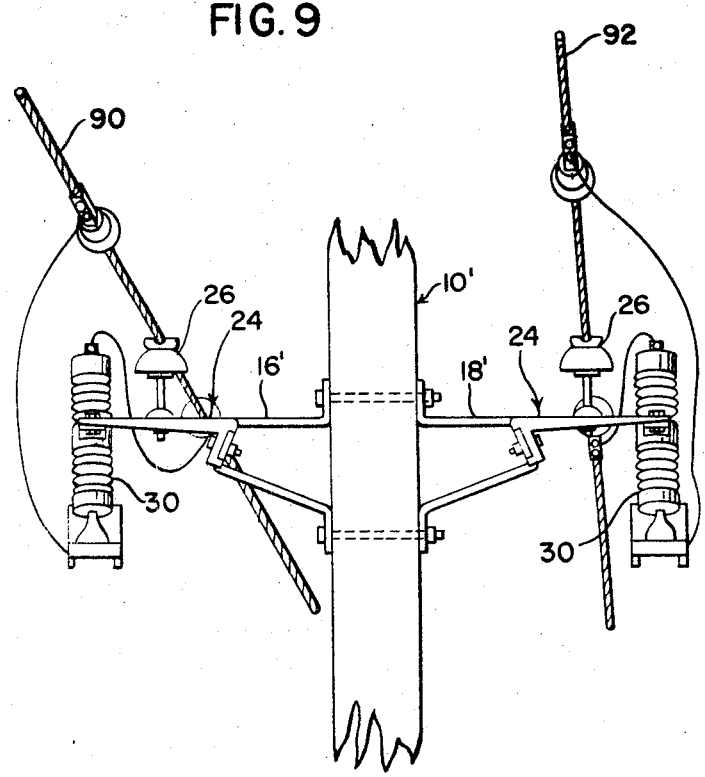
FIGURE 9 is an illustration of another application of the invention for system protection and/or sectionalizing; and, FIGURE 10 is a side view of a portion of the apparatus illustrated in FIGURE 9.
Figure 10:
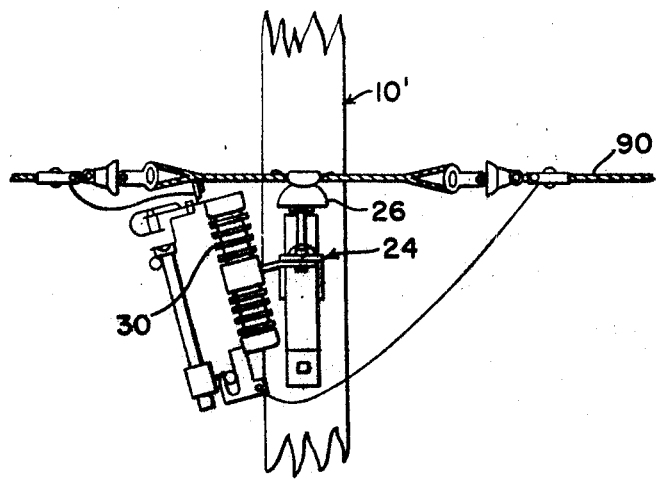

Reference is now made to FIGURES 9 and 10 which illustrate another application of the invention for purposes of system protection and/or sectionalizing. As shown in those figures, a utility pole 10' has mounted thereto a pair of insulator brackets 16' and 18' which correspond with brackets 16 and 18 shown in FIGURE 1. An extension 24 is mounted to each of the brackets 16' and 18'. Each extension 24 serves, in turn, to support an insulator 26 and a cutout assembly 30 for use with fuse or solid blade. As shown in FIGURE 9, the left hand insulator 26 supports a line conductor 90 and the right hand insulator 26 supports a line conductor 92. Each of the line conductors is electrically coupled through a cutout assembly 30 for use with fuse or solid blade, in the manner shown in FIGURES 9 and 10, for purposes of providing system protection and/or for purposes of sectionalizing distribution systems.

Having now described the preferred embodiments of the invention, it will be appreciated by those skilled in the art that certain modifications may be made without departing from the invention.

We claim:

1. A utility pole insulator bracket extension adapted to be secured to an insulator bracket mounted directly on a utility pole wherein said bracket includes a first portion which extends substantially horizontally away from said pole and terminates in a second portion which extends downwardly from said first portion and away from said pole; said extension including first and second sections, said first section adapted to be mounted to the second portion of said bracket; said second section extending at an angle from said first section and away from said pole, the included angle between said sections being such that said second section is substantially coplanar with the first portion of said bracket, said second section having means for mounting electrical components thereto, and means for securing said extension to said bracket, said first section includes means for receiving and securing the second portion of said bracket to prevent movement of said extension with respect to said bracket, said second section has an upper substantially flat surface, said second section being defined by vertical side edges which progressively taper inwardly toward each other in the direction away from said utility pole, reinforcing web portions connecting the side edges of said first section with the corresponding side edges of said second section, and said second section having first means for mounting electrical safety equipment and second means spaced inwardly toward said first section for mounting an elongated conductor so that said safety equipment and said conductor are mounted at substantially the same pole height with the safety equipment being spaced further away from said pole than said conductor to minimize the pole height required to support said safety equipment and said conductor while also permitting repairmen to have access to the conductor from the pole without having the safety equipment interposed therebetween.

2. An electrical power distribution system including: at least first and second elongated conductors; a plurality of utility poles each having means for supporting said first conductor on top of each said pole and means for comprising a utility pole insulator bracket extension adapted to be secured to an insulator bracket mounted directly on a utility pole and having first and second sections, said first section having an aperture in registry with the aperture in said second portion of said bracket;

said second section extending away from said pole in substantial coplanar relationship with said first portion of said bracket;

fastening means having a portion thereof extending through the apertures in said second portion and said first section for rigidly securing said bracket and extension together;

said first section having means protruding from opposite side edges thereof to receive said second portion of said bracket in such a manner to prevent relative rotational movement of said bracket and extension about an axis defined by said registered apertures; and said second section having first means for mounting electrical safety equipment and second means spaced inwardly toward said first section for mounting an elongated conductor so that said safety equipment and said second conductor are mounted at substantially the same pole height with the safety equipment being spaced further away from said pole than said second conductor to minimize the pole height required to support said safety equipment and said second conductor while also permitting repairmen to have access to said second conductor from the pole without having the safety equipment interposed therebetween.

References Cited

UNITED STATES PATENTS

| 1,183,460 | 5/1916 | Hjorth | 248—224 |
| 1,397,843 | 11/1921 | Rapp | 248—230 X |
| 3,145,259 | 8/1964 | Leonard et al. | 174—164 X |
| 3,309,047 | 3/1967 | Kane | 248—221 X |
| 3,369,788 | 2/1968 | Eisele | 248—221 |

ROY D. FRAZIER, Primary Examiner

J. FRANKLIN FOSS, Assistant Examiner

U.S. Cl. X.R.

174—158; 248—65